United States Patent
Yuasa et al.

(10) Patent No.: US 8,456,121 B2
(45) Date of Patent: Jun. 4, 2013

(54) MOTOR CONTROL DEVICE AND SEAT CONTROL DEVICE FOR VEHICLE

(75) Inventors: Daisuke Yuasa, Kariya (JP); Akira Aikawa, Aichi-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 366 days.

(21) Appl. No.: 12/858,795

(22) Filed: Aug. 18, 2010

(65) Prior Publication Data

US 2011/0043158 A1  Feb. 24, 2011

(30) Foreign Application Priority Data

Aug. 21, 2009  (JP) ................. 2009-192575

(51) Int. Cl.
*H02P 7/00*  (2006.01)

(52) U.S. Cl.
USPC ........... 318/469; 318/266; 318/280; 318/466; 318/452

(58) Field of Classification Search
USPC ............... 318/266, 280, 286, 466, 467, 468, 318/469, 452; 388/800, 811, 842
See application file for complete search history.

(56) References Cited

U.S. PATENT DOCUMENTS

| | | | | |
|---|---|---|---|---|
| 4,870,333 | A * | 9/1989 | Itoh et al. | 318/286 |
| 6,064,165 | A * | 5/2000 | Boisvert et al. | 318/465 |
| 6,580,242 | B2 * | 6/2003 | Hirose et al. | 318/445 |
| 6,580,243 | B2 * | 6/2003 | Itami et al. | 318/452 |
| 7,808,197 | B2 * | 10/2010 | Kimura et al. | 318/469 |
| 7,898,195 | B2 * | 3/2011 | Sone et al. | 318/280 |
| 8,217,612 | B2 * | 7/2012 | Boisvert et al. | 318/466 |
| 2009/0039812 | A1 | 2/2009 | Sone et al. | |

FOREIGN PATENT DOCUMENTS

| | | |
|---|---|---|
| JP | 2007-062507 A | 3/2007 |
| JP | 2008-136325 A | 6/2008 |

* cited by examiner

*Primary Examiner* — Antony M Paul
(74) *Attorney, Agent, or Firm* — Buchanan Ingersoll & Rooney PC

(57) ABSTRACT

A motor control device, which includes a main control portion configured to actuate a motor, which displaces a driven object between a first position and a second position in an acceleration control mode in which a rotation speed of the motor gradually increases, in a deceleration control mode in which the rotation speed of the motor gradually decreases, and in a constant speed control mode in which the rotation speed of the motor is maintained at a constant level, and a displacement interference detection portion detecting that the displacement of the driven object is interfered using an actual rotation speed, which is the actual rotation speed of the motor, and an ideal rotation speed of the motor, on which a control result by the main control portion including a feedback control is reflected.

14 Claims, 8 Drawing Sheets

MOTOR CONTROL DEVICE AND SEAT CONTROL DEVICE FOR VEHICLE

CROSS REFERENCE TO RELATED APPLICATIONS

This application is based on and claims priority under 35 U.S.C. §119 to Japanese Patent Application 2009-192575, filed on Aug. 21, 2009, the entire content of which is incorporated herein by reference.

TECHNICAL FIELD

This disclosure relates to a motor control device. More particularly, this disclosure pertains to a motor control device which detects an interference of displacement of a driven object whose position is displaced by means of a motor.

BACKGROUND DISCUSSION

A powered device is configured to displace its position by means of a motor. For example, JP2007-62507A (hereinafter referred to as Patent reference 1) discloses an electric driven seat apparatus for a vehicle, which is configured to switch a seatable state where an occupant is seatable and a stored state where a usable space in a vehicle is expanded by motors. According to the seat apparatus disclosed in Patent reference 1, the seatable state and the stored state are switched by an operation of a switch by the occupant. A seat cushion and a seatback are actuated by each of the motors while the occupant maintains the operation of the switch to switch the seatable state and the stored state.

During the switching operations between the seatable state and the stored state, there is a possibility that the seat cushion and the seatback entrap a part of the occupant's body, occupant's clothes, and other objects. In order to overcome this drawback, a motor control device includes a detection means for detecting an entrapment and/or a safety shutdown means. JP2008-136325A (hereinafter referred to as Patent reference 2) discloses a motor drive apparatus which includes a detection means for detecting an entrapment. In a case where a seatback is moved from a reclining position to an upright position, a frictional resistance may be generated between lateral surfaces of adjacent seatbacks, and the fictional resistance may be detected as an entrapment. For example, in a case where the apparatus detects the entrapment using a pulse obtained from a rotation sensor detecting a motor rotation, the apparatus may erroneously detect that the entrapment is caused when a pulse width is expanded due to the frictional resistance. In order to overcome this drawback, the motor drive apparatus disclosed in Patent reference 2 detects whether the entrapment is caused based on whether a value obtained by integrating variation of pulse cycle obtained from the rotation sensor exceeds a predetermined threshold value or not.

For example, in a case where a frictional resistance is generated between the lateral surfaces of the adjacent seatbacks, a load suddenly increases thereby increasing a length of a pulse cycle on a short-term basis. That is, a change rate of the pulse cycle surges. On the other hand, in a case where an entrapment is caused, a level of the load is gradually increased to gradually increase the length of the pulse cycle. In other words, the change rate of the pulse cycle gradually increases. According to Patent reference 2, an integrated value of ratios between one pulse cycle and a next pulse cycle (i.e., variation) of 150 cycles (i.e., 150 when there is no change) is obtained. In a case where the frictional resistance is generated between the lateral surfaces of the adjacent seatbacks, because the length of the pulse cycle is increased on the short-term basis, the maximum value of an integrated value of ratios between one pulse cycle and a next pulse cycle is assumed to be smaller than the case where the entrapment is caused in a long-term corresponding to 150 cycles. Accordingly, an erroneous detection of the entrapment is restrained by performing the detection of the entrapment based on the level of the integrated value and detects the entrapment when the integrated value exceeds the predetermined threshold value.

In a case where mechanical end points are provided within a movable range of a movable portion, for example, a case of vehicle seat, if a seat (seat cushion, or seatback) reaches the end point while the motor is steadily rotating, an impact noise and an uneasy vibration may be generated when the seat (seat cushion, or seatback) mechanically stops at the end point. Accordingly, a rotation speed of the motor may be gradually decreased when the seat (seat cushion, or seatback) comes to be in the vicinity of the end point so as to stop slowly. Similarly, in a case where the motor is actuated with a steady rotation speed immediately after starting operation of the seat (seat cushion, or seatback), the seat (seat cushion, or seatback) may be suddenly moved or an excessive load may be applied to the motor. Accordingly, the seat (seat cushion, or seatback) may be moved slowly at a start by gradually increasing the motor rotation speed. When the seat (seat cushion, or seatback) is controlled to start moving slowly or to stop slowly, pulse cycles obtained from the rotation sensor are varied. Thus, the application of disclosure in Patent reference 2 is not appropriate in case of controlling the rotation speed of the motor to gradually increase or gradually decrease. The entrapment could be detected by detecting that the length of the pulse cycle is increased during a constant speed operation or an accelerating operation of the motor with the construction disclosed in Patent reference 2. However, in a case where the motor is controlled to decrease the rotation speed, it is difficult to distinguish whether the length of the pulse cycle is decreased because of the speed reduction of the motor rotation or because of the entrapment of a part of an occupant's body, occupant's clothes, or other objects. Thus, a precision of the detection of the entrapment may be decreased.

A need thus exists for a motor control device and a seat control device which is not susceptible to the drawback mentioned above.

SUMMARY

In light of the foregoing, according to an aspect of the disclosure, a motor control device includes a main control portion configured to actuate a motor, which displaces a driven object between a first position and a second position in an acceleration control mode in which a rotation speed of the motor gradually increases, in a deceleration control mode in which the rotation speed of the motor gradually decreases, and in a constant speed control mode in which the rotation speed of the motor is maintained at a constant level, and a displacement interference detection portion detecting that the displacement of the driven object is interfered by using an actual rotation speed, which is the actual rotation speed of the motor, and an ideal rotation speed of the motor, on which a control result obtained by the main control portion including a feedback control is reflected.

According to another aspect of this disclosure, a seat control device for a vehicle includes a motor control device, which includes a main control portion configured to actuate a motor, which displaces a seat between a first position and a second position in an acceleration control mode in which a rotation speed of the motor gradually increases, in a deceleration control mode in which the rotation speed of the motor gradually decreases, and in a constant speed control mode in which the rotation speed of the motor is maintained at a constant level. The motor control device further includes a displacement interference detection portion detecting that the displacement of the seat is interfered using an actual rotation speed, which is the actual rotation speed of the motor, and an ideal rotation speed of the motor, on which a control result by the main control portion including a feedback control is reflected. The motor control device detects that the displacement of the seat is interfered.

According to further aspect of a motor control device includes a main control portion configured to actuate a motor, which displaces a powered device applied to a vehicle between a first position and a second position in an acceleration control mode in which a rotation speed of the motor gradually increases, in a deceleration control mode in which the rotation speed of the motor gradually decreases, and in a constant speed control mode in which the rotation speed of the motor is maintained at a constant level, and a displacement interference detection portion detecting that the displacement of the powered device is interfered using an actual rotation speed, which is the actual rotation speed of the motor, and an ideal rotation speed of the motor, on which a control result by the main control portion including a feedback control is reflected, the displacement interference detection portion including a reference difference maintaining portion, which maintains a difference between the ideal rotation speed and the actual rotation speed immediately before a control mode of the motor is shifted to the deceleration control mode as a reference difference, and a deceleration displacement interference detection portion detecting the interference of the displacement of the powered device when the motor is controlled in the deceleration control mode. The deceleration displacement interference detection portion detects that the displacement of the powered device is interfered based on a variation of a difference between the actual rotation speed and the ideal rotation speed relative to the reference difference.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

One embodiment will be explained with reference to illustrations of drawing figures as follows. A motor control device disclosed here controls a motor in accordance with a position of a driven object whose position is displaced by an actuation of the motor. The driven object, for example, includes an automatic sliding door for a building, an electric driven seat for a vehicle, a slide door, and a power window. According to this embodiment, a powered device including the electric driven seat, the slide door, and the power window is applied as the driven object, and an entrapment of a part of an occupant's body, occupant's clothes, and other objects at the powered device which interferes with the displacement of the powered device will be explained.

Figure 1:
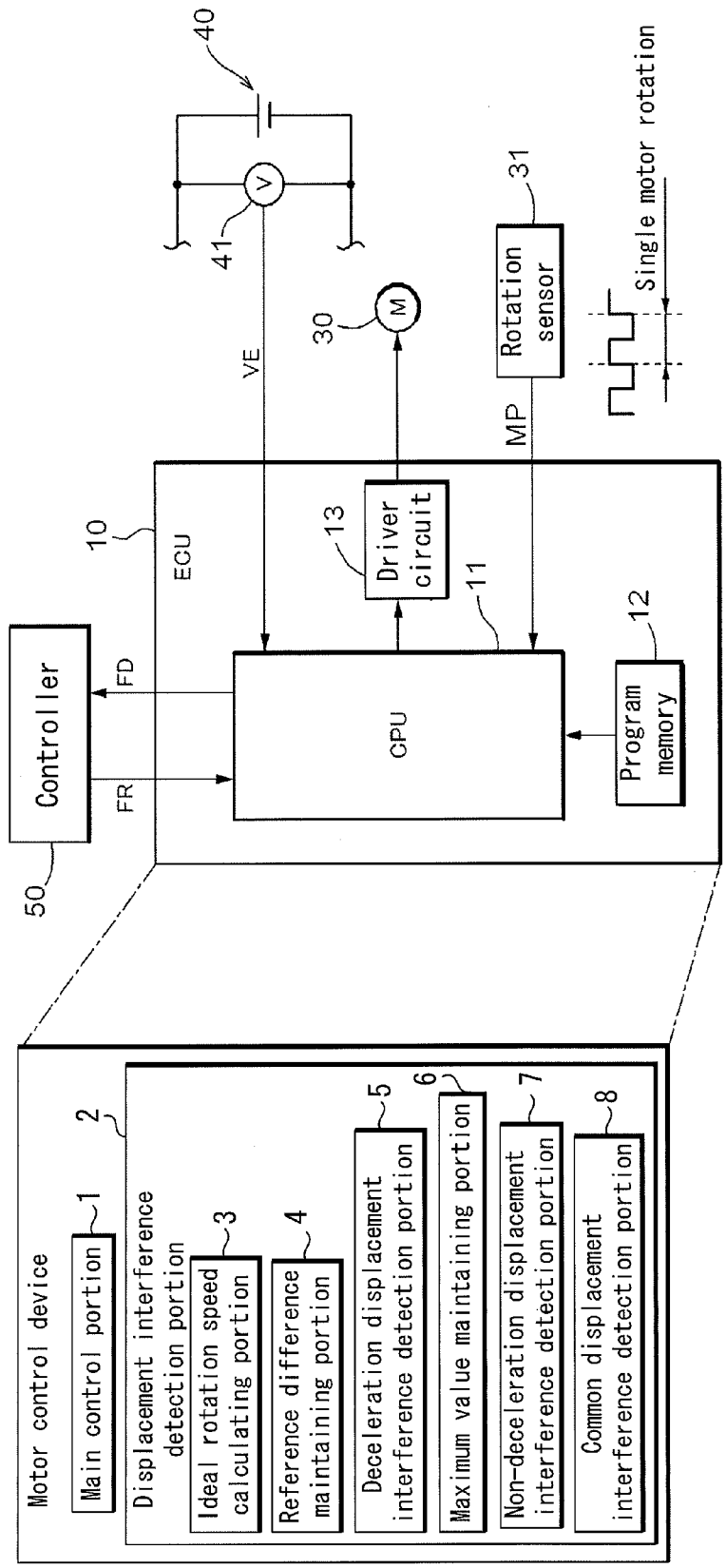
FIG. 1 is a block diagram schematically illustrating an example of a motor control device disclosed here.

As shown in FIG. 1, the motor control device is constructed as an electric control unit (ECU) 10 which includes a central processing unit (CPU) 11 as a core for a control. The ECU 10 includes a program memory 12 and a driver circuit 13. The program memory 12 memorizes a software program executed by the CPU 11. The driver circuit 13 actuates a motor 30 by converting an output of the CPU 11, which is generally a low-voltage circuit, to a motor actuation voltage, which is higher than a power supply voltage of the CPU 11. The motor control device includes various functional portions as indicated with reference numerals 1 to 8 in FIG. 1. Those portions 1 to 8 are achieved, for example, with a hardware such as the CPU 11 and the driver circuit 13, and a software memorized in the program memory 12, which cooperate with each other. The construction of the portions 1 to 8 is not limited to the aforementioned construction. Alternatively, for example, the ECU 10 may be constructed with a digital signal processor, other logical processor, or a logical circuit, or the like.

The motor 30 is provided with a rotation sensor 31 which detects a rotation of the motor 30. The rotation sensor 31 may be either separately provided or built-in the motor 30. The rotation sensor 31, for example, includes a Hall effect sensor IC to output a pulse signal MP in accordance with a rotation speed of the motor 30. The ECU 10 detects a position of the powered device, whose position is displaced by the motor 30, by a pulse number of the pulse signal MP. Thus, the rotation sensor 31 serves as a positional sensor which detects the position of the driven object in addition to detecting the rotation number and rotation speed of the motor 30. According to the embodiment, the rotation sensor 31 is a sensor with low resolution and low cost which outputs one cycle pulse signal MP for each rotation of the motor 30. A sensor with higher resolution is applicable to the rotation sensor 31, however, the application of the sensor at a lower cost is favorable in order to restrain an increase of manufacturing costs because a large number of electronic components are mounted to a vehicle. According to the embodiment, an entrapment of a part of an occupant's body, occupant's clothes, and other objects is favorably detected even when the low resolution sensor is applied as the rotation sensor 31.

The motor 30 is actuated by an electric power supplied from a battery 40 mounted to the vehicle. An electric voltage of the electric power supplied from the battery 40 may fluctuate due to various factors. In order to overcome the fluctuation of the electric voltage, detection results of a voltmeter (voltage sensor) 41, which measures power supply voltage of the battery 40, is inputted to the ECU 10. The ECU 10 controls an actuation of the motor 30 taking into account the power supply voltage supplied to the motor 30. The ECU 10 is provided for each of the motors 30, which actuates the powered devices including the vehicle seat, the power slide door, and the power window, for controlling each of the motors 30. Each ECU 10 executes a control based on an actuation command outputted from a controller 50. A detection of an entrapment of a part of an occupant's body, occupant's clothes, and other objects is executed based on an entrapment detection request flag FR outputted from the controller 50. When the entrapment is detected, the detected result is transmitted from each of the ECUs 10 to the controller 50 by means of an entrapment detection flag FD.

As shown in FIG. 1, the ECU (i.e., motor control device) 10 serving also as a displacement interference detection device (e.g., an entrapment detection device) includes a main control portion 1, a displacement interference detection portion 2, an ideal rotation speed calculating portion 3, a reference difference maintaining portion 4, a deceleration displacement interference detection portion 5, a maximum value maintaining portion 6, a non-deceleration displacement interference detection portion 7, and a common displacement interference detection portion 8. The main control portion 1 is configured to actuate the motor 30, which displaces the powered device from a first position to a second position, or vice versa in a maximum range, by an acceleration control in which the rotation speed of the motor 30 is gradually increased, a deceleration control in which the rotation speed of the motor 30 is gradually decreased, and a constant speed control in which the rotation speed of the motor 30 is maintained at a constant speed. The main control portion 1 controls the motor 30 by a pulse width modulation (PWM). The displacement interference detection portion (the entrapment detection portion) 2 detects that the displacement of the powered device is interfered, for example by the entrapment, using an actual rotation speed V which is an actual rotation speed of the motor 30 and an ideal rotation speed A of the motor 30 on which results of the control by the main control portion 1 including a feedback control are reflected. The other functional portions described above constructs the displacement interference detection portion 2. Details of each of the functional portions will be described hereinafter.

Figure 2A:
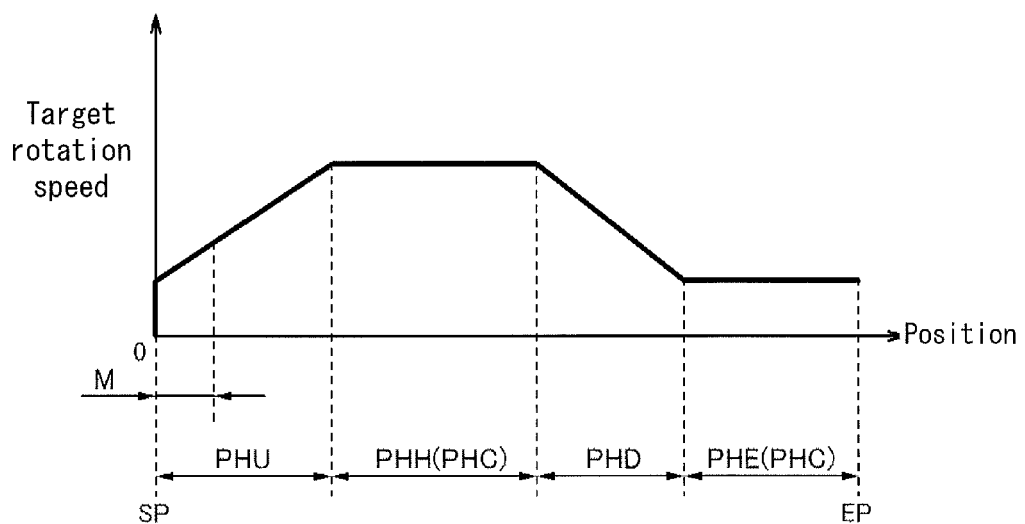
FIG. 2A is an overview of a speed control where a driven object starts displacing from a reference position.
Figure 2B:
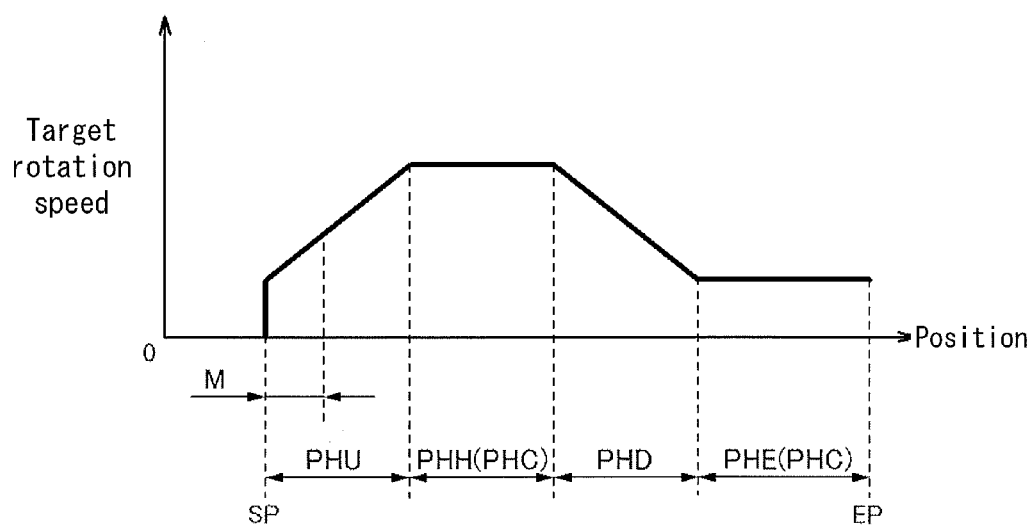
FIG. 2B is an overview of a speed control where a driven object starts displacing from a position other than the reference position.

First, an outline of a speed control of the motor 30 by the motor control device will be explained with reference to FIGS. 2A and 2B in which a relationship between the position of the powered device and a target rotation speed of the motor 30 is shown. The main control portion 1 controls the actuation of the motor 30 based on the target rotation speed. As shown in FIGS. 2A and 2B, an acceleration phase PHU, a constant speed phase PHC, and a deceleration phase PHD are provided in accordance with changes in the target rotation speed. The acceleration phase PHU is a phase in which a motor rotation speed gradually increases from starting the operation of the motor 30 to a steady operation with maximum speed. The deceleration phase PHD is a phase in which a motor rotation speed gradually decreases from the steady operation with maximum speed to stop the operation of the motor 30 eventually. According to the embodiment, the rotation speed of the motor 30 is gradually decreased from the steady operation with the maximum speed to a speed at which the motor 30 steadily operates at lower speed. The constant speed phase PHC includes a higher constant speed phase PHH in which the motor 30 is steadily actuated at the maximum speed, and a final constant speed phase PHE in which the motor 30 is steadily actuated at a lower speed to eventually stop the operation of the powered device. In a case where an elastic member, for example, a rubber member is arranged at end points (i.e., serving as the first position and the second position) of the movable range of the powered device, the driven object which reaches the end point with adequately low speed completes the displacement without receiving an impact. Accordingly, the powered device is gradually decreased to stop through the deceleration phase PHD and the final constant speed phase PHE.

FIG. 2A illustrates a case where the powered device starts displacing from a zero position (i.e., first position or second position) which is a reference position. FIG. 2B illustrates a case where the powered device starts displacing from a position other than the reference position (i.e., an intermediate position between the first position and the second position). As shown in FIGS. 2A and 2B, irrespective of a starting position SP from which the powered device starts displacing, figures showing transitions of the target rotation speeds of the motor 30 are assumed to be analogous. Accordingly, the powered device moves from a start of the displacement to an end of the displacement (i.e., a displacement completion position EP; first position or second position) similarly in appearance irrespective of the starting position SP from which the powered device starts displacing. Thus, the movement of the powered device gives a sense of unity to a user.

Referring to FIGS. 2A and 2B, the relationship between the target rotation speed of the motor 30 and the positional displacement of the powered device will be explained as follows. At the starting position SP from which the powered device starts displacing, the target rotation speed is set to be an initial rotation speed. The initial rotation speed is determined to be a speed by which the motor 30 smoothly starts rotating. Next, the target rotation speed is gradually increased so that the rotation speed of the motor 30 is gradually increased from the initial rotation speed which is a low rotation speed and the powered device gradually starts moving (accelerating phase PHU). The main control portion 1 executes a feed-forward control from a start of actuation until the powered device displaces its position by a predetermined initial moving amount (distance) M. The main control portion 1 executes a feedback control after the powered device displaces exceeding the predetermined initial moving amount M. In the feed-forward control, the target rotation speed is increased by a predetermined increasing rate. In a case where a feedback control is executed immediately after the start of the actuation, a large degree of hunting may be generated at the actual rotation speed V. Particularly, in a case where the sensor with the low resolution is applied as the rotation sensor 31, like the embodiment, the large degree of hunting is more likely to be generated. The large degree of hunting may need some time to be resolved. On the other hand, in a case where a feed-forward control is executed immediately after the start of the actuation, the actual rotation speed V is likely to follow the target rotation speed without being influenced by detection results of the rotation sensor 31 having the low resolution. In those circumstances, the initial moving amount (distance) M corresponds to an initial mask time for a transaction for detecting an entrapment.

When the rotation speed of the motor 30 is gradually increased, the phase is transited to the higher constant speed phase PHH. When the powered device is displaced further, the target rotation speed is gradually decreased so that the phase of the motor 30 is transited to the deceleration phase PHD in which the rotation speed of the motor 30 is gradually decreased. In a case where the starting position SP from which the powered device starts displacing is close to the displacement completion position EP, or in a case where the displaced amount of the powered device is increased because the rotation speed of the motor 30 is assumed to be equal to or greater than the target rotation speed due to the high power supply voltage of the battery 40, the phase of the motor 30 is transited to the deceleration phase PHD without the higher constant speed phase PHH. At the deceleration phase PHD, when the target rotation speed is declined to the final constant rotation speed at which the motor 30 steadily operates at a lower speed, so that the motor 30 eventually stops, the target rotation speed is maintained at the final constant rotation speed. Thereafter, the motor 30 is actuated under the final constant speed phase PHE. The final constant rotation speed is defined to be an adequately low speed. The powered device continues the displacement to the mechanical end points (displacement completion position EP; the first position or the second position) while maintaining the final constant rotation speed. In a case where an elastic member, for example, a rubber member is arranged at the end points (the first position and the second position) of the movable range of the powered device, the driven object which reaches the end point with adequately low speed completes the displacement without receiving an impact. In those circumstances, the powered device may be displaced to the mechanical end point (displacement completion position EP) in the deceleration phase PHD without the final constant speed phase PHE. After the powered device displaces exceeding the initial moving amount (distance) M, the motor 30 is controlled to actuate by the feedback control in all of the phases including the acceleration phase PHU, the constant speed phase PHC (PHH, PHE), and the deceleration phase PHD.

As explained above, the displacement interference detection portion 2 detects that the displacement of the powered device is interfered, for example by the entrapment, using the actual rotation speed V of the motor 30 and the ideal rotation speed A of the motor 30. The displacement interference detection portion 2 includes the ideal rotation speed calculating portion 3 as shown in FIG. 1. The ideal rotation speed calculating portion 3 calculates the ideal rotation speed A based on the following formula.

$$A = PD \times (VE/VR) \times F$$

Here, a mathematical formula model is represented by F, a duty ratio for the pulse width modulation is represented by PD, a power supply voltage of the battery 40 is represented by VE, and a power supply voltage when the mathematical formula model F is structured is represented by VR.

As shown above, the formula to obtain the ideal rotation speed A is a function having the duty ratio PD for the pulse width modulation as a variable. The duty ratio PD is determined by the main control portion 1 based on the target rotation speed, the actuation rotation speed V, and the power supply voltage VE. Particularly, when the main control portion 1 executes the feedback control, the duty ratio PD is changed in order to reduce a difference between the target rotation speed and the actual rotation speed. Accordingly, the control results of the main control portion 1 including the feedback control is reflected on the ideal rotation speed A.

Figure 3:
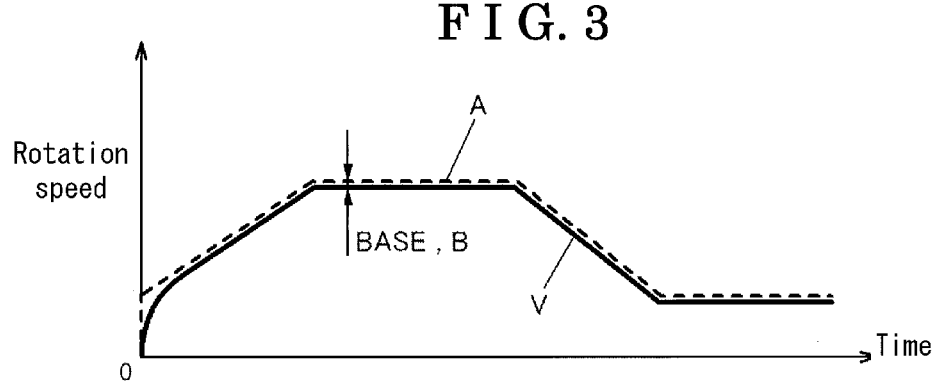
FIG. 3 is a view schematically illustrating an ideal relationship between an ideal rotation speed and an actual rotation speed.

FIG. 3 shows a relationship between the ideal rotation speed A and the actual rotation speed V when the motor 30 ideally rotates and the powered device ideally displaces its position without a generation of an interfering condition such as the entrapment. In an ideal condition, as shown in FIG. 3, there is a small difference between the ideal rotation speed A and the actual rotation speed V, and an occurrence of an fluctuation is small. However, in a case where an interfering condition such as the entrapment occurs, a difference between the ideal rotation speed A and the actual rotation speed V expands. A difference between the ideal rotation speed A and the actual rotation speed V is defined as difference B. Using the difference B, an occurrence of the interfering condition such as the entrapment is detected. Because of an environment of usage, secular change, and dispersion of products, a predetermined difference is generated between the ideal rotation speed A and the actual rotation speed V depending on how the mathematical formula model F is constructed. The predetermined difference between the ideal rotation speed A and the actual rotation speed V is defined as a reference difference BASE.

The actual rotation speed V may fluctuate to increase or decrease even during the constant speed phase PHC, and the actual rotation speed V may decline temporarily even during the acceleration phase PHU. A control for declining the actual rotation speed V is not executed during the acceleration phase PHU and the constant speed phase PHC. Accordingly, a difference CC between a preceding maximum rotation speed C during the control and the latest actual rotation speed V is caused by a factor which is irrelevant to the control. The factor may be, for example, the condition which interferes with the displacement of the powered device such as the entrapment, and an occurrence of the entrapment, or the like, can be detected with high precision based on the difference CC between the maximum rotation speed C and the actual rotation speed V.

Figure 4:
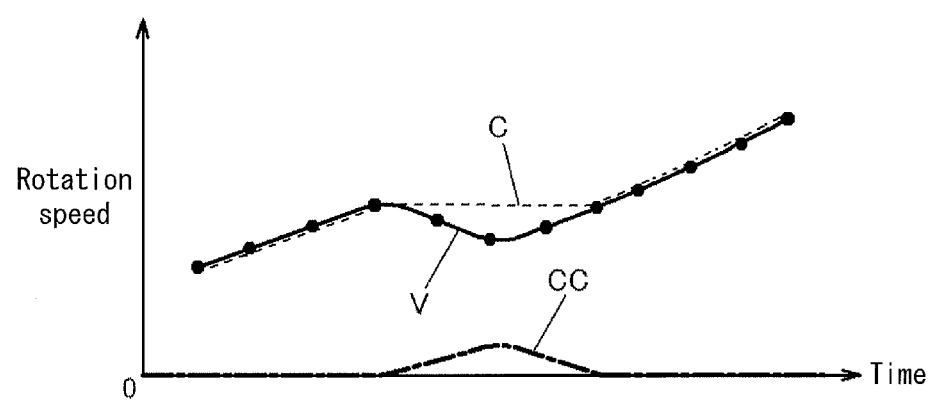
FIG. 4 is a view showing a graph that a maximum rotation speed is maintained during an acceleration speed control and a constant speed control.
Figure 5:
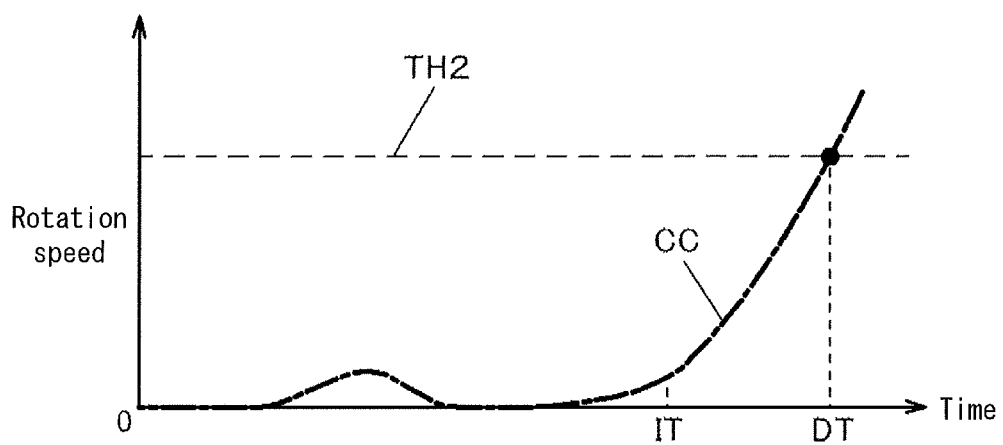
FIG. 5 is a view showing changes in a difference between the maximum rotation speed and the actual rotation speed when an entrapment is generated.
Figure 8:
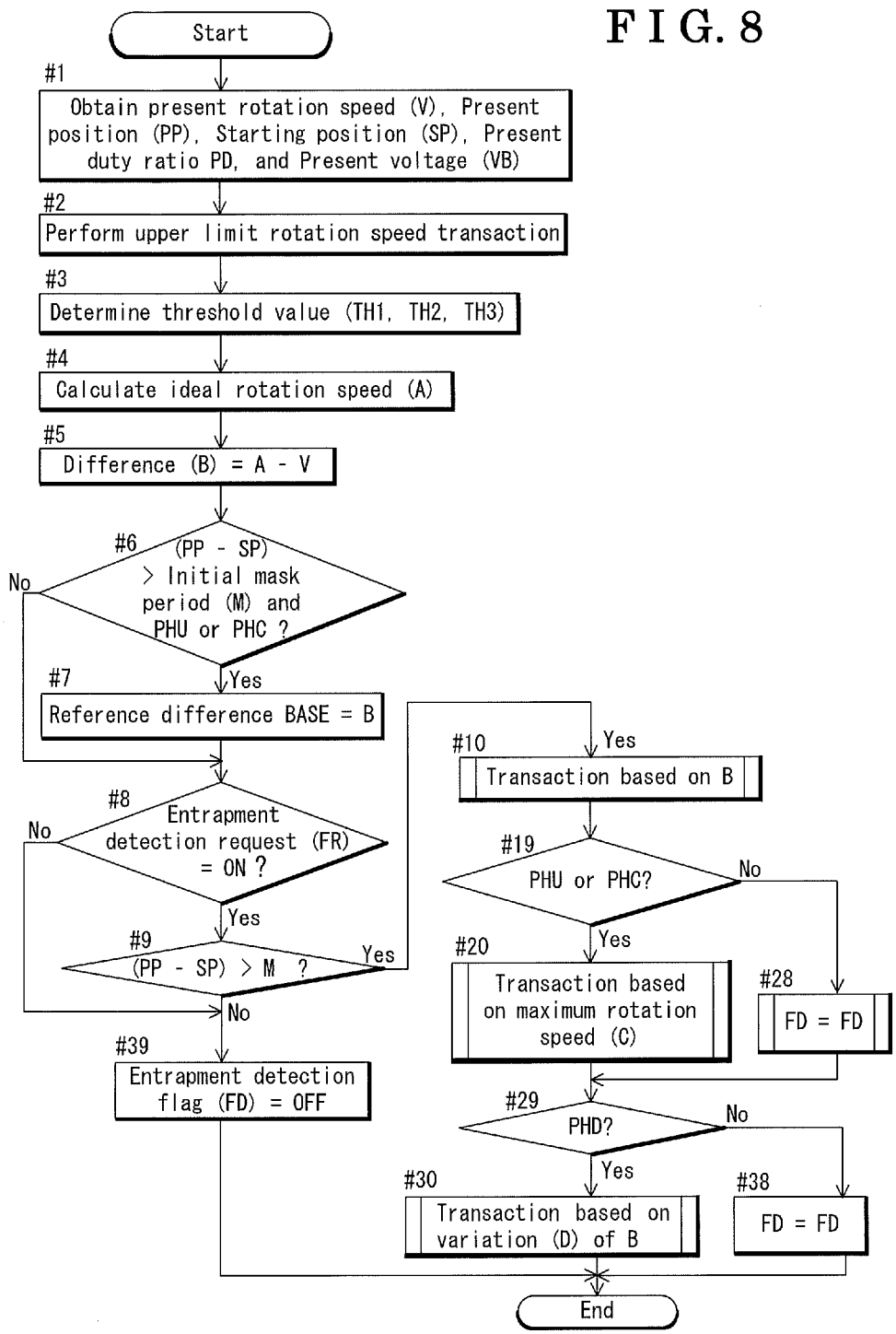
FIG. 8 is a flowchart for an entrapment detection transaction.

FIG. 4 shows a graph for maintaining the maximum rotation speed during the acceleration phase PHU and the constant speed phase PHC. Dots in FIG. 4 indicate sampling points for every calculation cycle of the ECU 10 (see #1 in FIG. 8). As shown in FIG. 5, the difference CC between the preceding maximum rotation speed C and the latest actual rotation speed V increases from time IT at which an entrapment occurs. At time DT at which the difference CC reaches a threshold value TH2, the ECU 10 determines that the entrapment occurs. As shown in FIG. 1, the displacement interference detection portion 2 includes the maximum value maintaining portion 6 which maintains the maximum value (maximum rotation speed) C of the actual rotation speed V when the motor 30 is controlled during the acceleration control or the constant speed control. Further, the displacement interference detection portion 2 includes the non-deceleration displacement interference detection portion 7 which detects an occurrence of the interference of the displacement when the motor 30 is controlled during the acceleration control or the constant speed control. The maximum value C is maintained at the maximum value maintaining portion 6 and the non-deceleration displacement interference detection portion 7 detects that the displacement of the powered device is interfered, for example by the entrapment, based on the difference CC between the latest actual rotation speed V and the maximum value C. Particularly, the non-deceleration displacement interference detection portion 7 detects that the displacement of the powered device is interfered, for example by the entrapment, when the difference CC is greater than the threshold value TH2.

Figure 6:
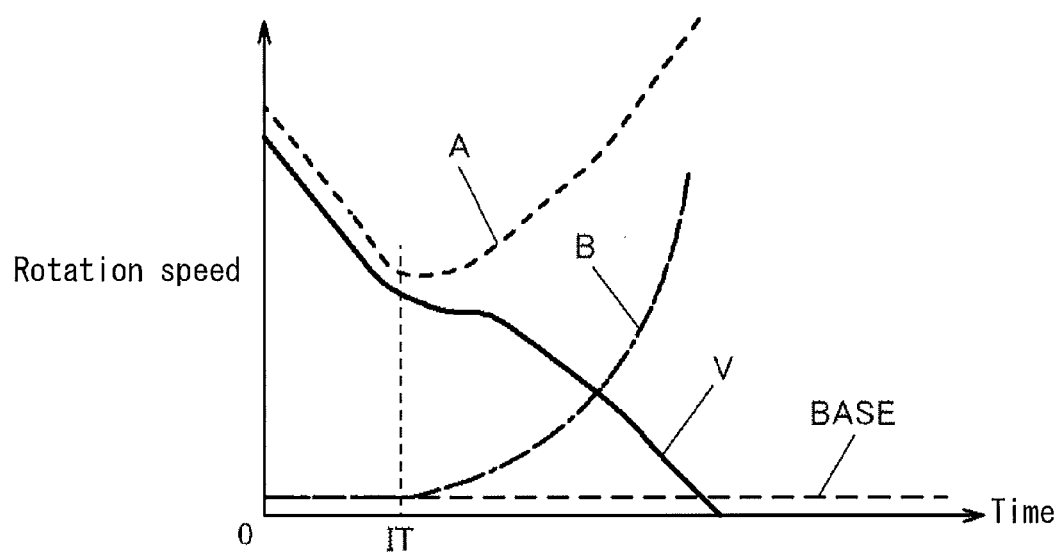
FIG. 6 is a view showing the ideal rotation speed, the actual rotation speed, and the changes in the difference between the maximum rotation speed and the actual rotation speed when an entrapment is generated.

As explained above, the difference B between the ideal rotation speed A and the actual rotation speed V expands when the interfering condition such as the entrapment occurs. For example, when the displacement of the powered device is interfered, for example, by the entrapment, the actual rotation speed V is assumed to be smaller relative to the target rotation speed, an output (torque) is increased as a result of the feedback control. More particularly, the duty ratio PD is increased. The results of the control by the main control portion 1 including the feedback control is reflected on the ideal rotation speed A, and a value of the ideal rotation speed A increases because the duty ratio PD serves as a variable for the ideal rotation speed A. On the other hand, when the displacement of the powered device is interfered, the actual rotation speed V does not increase even if the torque is increased by increasing the duty ratio PD. Particularly, when the entrapment, or the like, occurs unlike an occurrence of friction, as shown in FIG. 6, the actual rotation speed V gradually decreases from time IT at which the entrapment is generated. Because a difference between the actual rotation speed V and the target rotation speed expands by the declination of the actual rotation speed V, the main control portion 1 increases the duty ratio PD in order to further increase the torque. In consequence, as shown in FIG. 6, the ideal rotation speed A increases from time IT at which the entrapment occurs.

Figure 7:
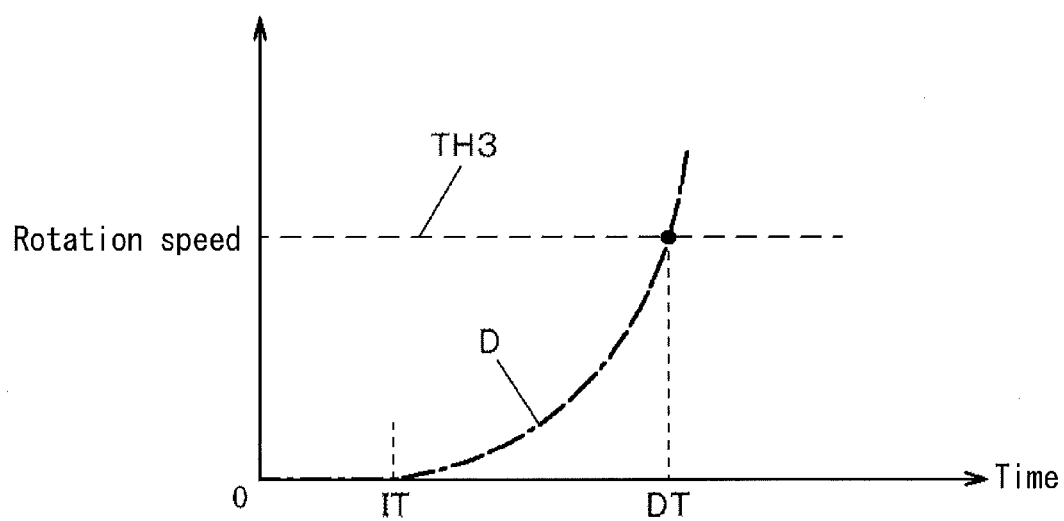
FIG. 7 is a view showing a variation of the difference between the ideal rotation speed and the actual rotation speed.

Consequently, the difference B between the ideal rotation speed A, which increases in response to the control results by the main control portion 1, and the actual rotation speed V, which decreases in response to the interference of the displacement of the powered device, expands. FIG. 6 shows the deceleration phase PHD in which the actual rotation speed V decreases even if the entrapment does not occur, or before the entrapment occurs. Thus, the interference of the displacement of the powered device is favorably detected even when the actual rotation speed V declines by the deceleration control. Further, as explained above, because the reference difference BASE is determined considering an environment of usage, the secular change, and the dispersion of the product, as shown in FIG. 7, based on a variation D of the difference B relative to the reference difference BASE, the entrapment may be detected when the variation D is assumed to be greater than a threshold value TH3.

As shown in FIG. 1, the displacement interference detection portion 2 includes the reference difference maintaining portion 4 which maintains the reference difference BASE, and the deceleration displacement interference detection portion 5 which detects the interference of the displacement when the motor 30 is controlled under the deceleration control. The deceleration displacement interference detection portion 5 detects that the displacement of the powered device is interfered based on the variation D of the difference B between the actual rotation speed V and the ideal rotation speed A relative to the reference difference BASE. The reference difference maintaining portion 4 maintains the difference B between the ideal rotation speed A and the actual rotation speed V immediately before the control of the motor 30 is transited to the deceleration control as the reference difference BASE. In a case where an entrapment occurs during the deceleration control, the value of the reference difference BASE fluctuates. For the purpose of detecting the entrapment during the deceleration control using the difference B between the ideal rotation speed A and the actual rotation speed V, fluctuation of the reference difference BASE is not favorable. In order to overcome the drawback, according to the embodiment, the difference B during the constant speed control or the acceleration control immediately before transiting to the deceleration control is maintained as the reference difference BASE. In those circumstances, in a case where the constant speed control is executed immediately before transiting to the deceleration control, and the difference B between the ideal rotation speed A and the actual rotation speed V at the constant speed control is maintained as the reference difference BASE, a more stable value is determined.

In a case where the entrapment occurs as explained above, the difference B between the ideal rotation speed A, which increases reflecting the results of the control by the main control portion 1 thereon, and the actual rotation speed V, which declines in response to the interference of the displacement of the powered device, expands. Accordingly, even when the actual rotation speed V declines by the deceleration control, the occurrence of the interference of the displacement of the driven object (powered device) is favorably detected. Further, because whether the interference of the displacement of the powered device occurs, for example by the entrapment, is detected based on the variation D of the difference B relative to the reference difference BASE during the deceleration control, detection with high precision is attained. In those circumstances, in a case where an entrapment is generated when the powered device starts displacing its position and the phase of the control of the motor 30 transits to the deceleration control without detecting the interference of the displacement during the acceleration control and the constant speed control, the detection of the interference of the displacement (e.g., the entrapment) of the powered device may further be delayed or may not be attained because the value of the reference difference BASE cannot be properly attained.

According to the embodiment, in order to overcome the drawback, the displacement interference detection portion 2 includes the common displacement interference detection portion 8 which detects the interference of the displacement of the powered device (e.g., the entrapment) irrespective of the control states of the motor 30. The common displacement interference detection portion 8 detects that the displacement of the powered device is interfered (e.g., occurrence of the entrapment) when the difference B between the actual rotation speed V and the ideal rotation speed A is equal to or greater than a predetermined threshold value TH1. Using the common displacement interference detection portion 8, the detection of the interference of the displacement of the powered device applying the ideal rotation speed A is executed even during the acceleration control and the constant speed control, and the same is executed during the deceleration control applying another reference for judgment including the variation D of the difference B between the ideal rotation speed A and the actuation rotation speed V. In consequence, an interference detection performance which is applicable to wide range of conditions is ensured.

Referring to FIGS. 8 to 11, a procedure for a motor control including the above-explained detection of the entrapment will be explained as follows. The detection of the entrapment by the ECU 10 is performed by repeatedly executing a series of transactions, shown in FIG. 8, for every calculation cycle of the CPU 11. The calculation cycle is determined, for example, 5 ms. The CPU 11 obtains the present rotation speed (actual rotation speed) V, the present position PP, a start portion SP, the present duty ratio PD, and the present voltage (power supply voltage) VB (Step #1) at the beginning of the calculation cycle. Next, the CPU 11 performs an upper limit rotation speed transaction in which an upper limit of the rotation speed which is allowed in each of the acceleration control, the constant speed control, and the deceleration control, is defined. This transaction is performed as a fail safe which prevents an erroneous detection when a rotation speed exceeding the maximum rotation speed of the motor 30 in terms of the specification is erroneously inputted. Thereafter, a threshold value (TH1, Th2, Th3) which is applied for an entrapment detection transaction is determined (Step #3).

Then, the ideal rotation speed A is calculated using a formula A=PD×(VE/VR)×F which applies the mathematical formula model F (Step #4). Thereafter, based on the calculated ideal rotation speed A and the present rotation speed V obtained at Step #1, the difference B is calculated (Step #5). Preceding the execution of the transaction for detecting the condition, for example, an entrapment, which interferes with the displacement of the powered device, whether an initial mask period M has elapsed is determined (Step #6). In the meantime, whether the phase of the motor control is at the acceleration phase PHU or the constant speed phase PHC is determined (Step #6). In a case where both conditions are satisfied, the difference B calculated at Step #5 is determined (renewed) as the reference difference BASE (Step #7). In a case where the initial mask period M has not elapsed or the phase of the motor control is at the deceleration phase PHD, the reference difference BASE is not determined (renewed), and the transaction advances to Step #8.

At Step #8, whether the entrapment detection request flag FR from the controller 50 is ON or not is determined. In a case where the entrapment detection request flag FR is OFF, the entrapment detection flag FD is determined (renewed, or re-determined) at Step #39 to end the entrapment detection transaction. In a case where the entrapment detection request flag FR is ON, an interference detection (e.g., entrapment detection) transaction is executed by the common displacement interference detection portion 8, the non-deceleration displacement interference detection portion 7, and the deceleration displacement interference detection portion 5, after the transaction at Step #9 (Steps #10 through #38). When it is determined that the initial mask period M has elapsed at Step #9, first, the entrapment detection transaction by the common displacement interference detection portion 8 is executed (Step #10). On the other hand, when it is determined that the initial mask period M has not elapsed at Step #9, the CPU 11 determines (renews, or re-determines) the entrapment detection flag FD to be in an OFF state to end the entrapment detection transaction for the calculation cycle.

Figure 9:
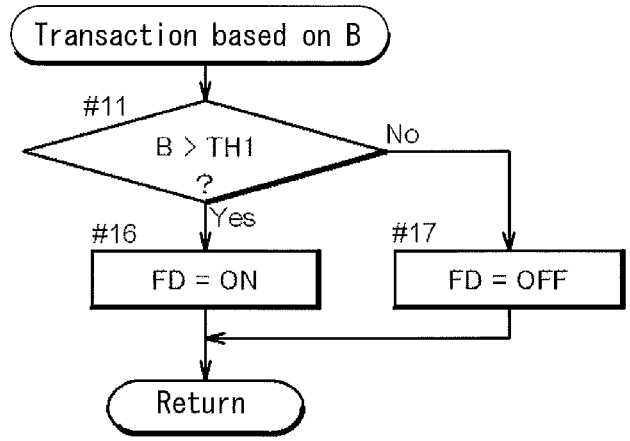
FIG. 9 is a flowchart of a sub-transaction based on the difference between the ideal rotation speed and the actual rotation speed.

The common displacement interference detection portion 8 executes the entrapment detection transaction (Step #10) which detects that the displacement of the powered device is interfered, for example, by the entrapment when the difference B between the present rotation speed V and the ideal rotation speed A is equal to or greater than the threshold value TH1 irrespective of the control states of the motor 30. More particularly, as shown in FIG. 9, the difference B and the threshold value TH1 is compared (Step #11), and when the difference B is greater than the threshold value TH1, the entrapment detection flag FD is determined (renewed, or re-determined) to be an ON state (Step #16). That is, the entrapment is detected. In a case where the difference B is equal to or less than the threshold value TH1, the entrapment is not detected, and the entrapment detection flag FD is determined (renewed, or re-determined) to be an OFF state (Step #17). As explained above, the entrapment detection transaction by the common displacement interference detection portion 8 may be applied as the fail safe function. In those circumstances, the threshold value TH1 may be determined to be greater than the threshold value TH3. That is, the transaction of Step #30 by the deceleration displacement interference detection portion 5 is prioritized in a normal operation, the erroneous detection is restrained.

Figure 10:
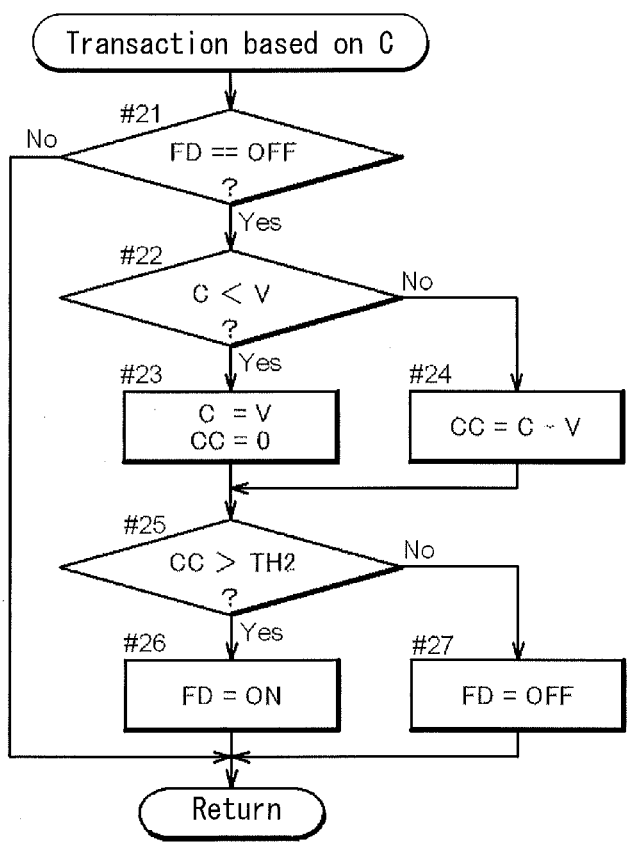
FIG. 10 is a flowchart of a sub-transaction based on the maximum rotation speed.

After the entrapment detection transaction (Step #10) by the common displacement interference detection portion 8 is completed, an entrapment detection transaction (Step #20) mainly by the non-deceleration displacement interference detection portion 7 is executed after the transaction of Step #19. The transaction of Step #19 determines that the motor 30 is controlled in a non-deceleration control, that is, the motor 30 is controlled in the acceleration control (acceleration phase PHU), or the constant speed control (constant speed phase PHC). In a case where the non-deceleration control (acceleration control, or constant speed control) is not applied to the motor 30, the transaction of Step #20 is not executed, and the entrapment detection flag FD maintains the present state (Step #28). When it is determined that the non-deceleration control (acceleration control, or constant speed control) is applied to the motor 30 at the transaction of Step #19, the non-deceleration displacement interference detection portion 7 executes the entrapment detection transaction (Step #20) which detects that the displacement of the powered device is interfered, for example, by the entrapment based on the difference CC between the latest actual rotation speed V and the maximum value C. Prior to the entrapment detection transaction, first, as shown in FIG. 10, whether the entrapment detection flag FD is in the ON state is determined (Step #21). That is, in a case where the entrapment detection flag FD has been already in the ON state at the entrapment detection transaction (Step #10) by the common displacement interference detection portion 8, another entrapment detection transaction does not have to be executed in the same calculation cycle, and thus the state of the entrapment detection flag FD is maintained to end the transaction of Step #20.

When the entrapment detection flag FD is in the OFF state, consecutively, the present rotation speed V and the maximum value C are compared (Step #22). When the present rotation speed V is greater than the maximum rotation speed C, the maximum rotation speed C is renewed as the present rotation speed V so that the difference CC is determined to be zero (Step #23). In a case where the present rotation speed V is equal to or less than the maximum rotation speed C, the maximum rotation speed C is maintained to calculate the difference CC (Step #24). The transaction of Steps #22 through #24 is the transaction to maintain the maximum value of the present rotation speed V, and is executed by the maximum value maintaining portion 6 and the non-deceleration displacement interference detection portion 7, which cooperates with each other. Thereafter, the difference CC and the threshold value TH2 are compared (Step #25). When the difference CC is greater than the threshold value TH2, the entrapment detection flag FD is determined (renewed) to be the ON state (Step #26). That is, the entrapment is detected. In a case where the difference B is equal to or less than the threshold value TH2, the entrapment is not detected, and the entrapment detection flag FD is determined (renewed) to be the OFF state (Step #27).

When the entrapment detection transaction (Step #20) by the non-deceleration displacement interference detection portion 7 is completed, or when the state of the entrapment detection flag FD is maintained at the transaction of Step #28 without the execution of the transaction of Step #20, an entrapment detection transaction (Step #30) by the deceleration displacement interference detection portion 5 is executed after the transaction of Step #29. In the transaction of Step #29, whether the motor 30 is controlled in the deceleration control mode, that is, whether the phase of the motor 30 is deceleration phase PHD is determined. In a case where the motor 30 is not actuated in the deceleration control mode, the present state of the entrapment detection flag FD is maintained (Step #38) without the execution of the transaction Step #30 to end the entrapment detection transaction of the calculation cycle. In those circumstances, in a case where the entrapment detection flag FD is at the ON state at either one of the transactions of Step #10 or #20, a signal indicating that the entrapment detection flag FD is at the ON state is transmitted to the controller 50.

Figure 11:
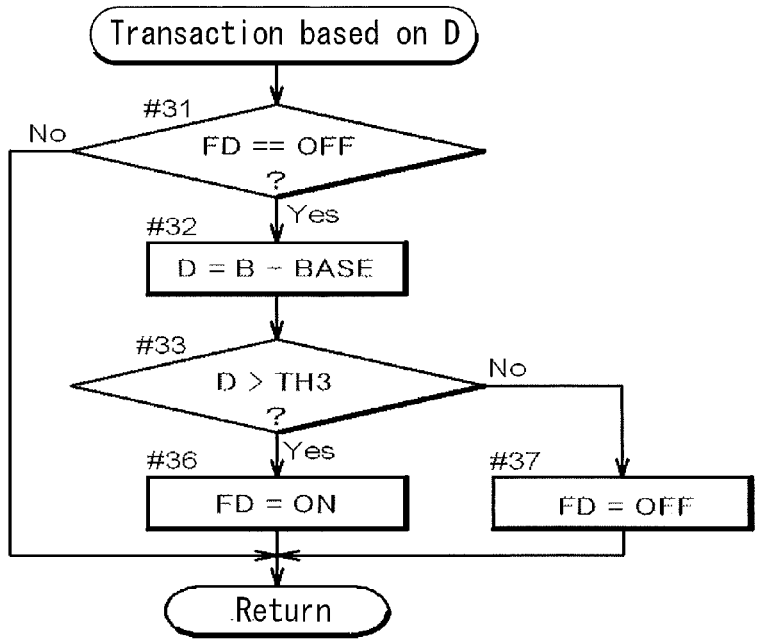
FIG. 11 is a flowchart of a sub-transaction based on the variation of the difference between the ideal rotation speed and the actual rotation speed.

The deceleration displacement interference detection portion 5 executes the entrapment detection transaction (Step #30) which detects that the displacement of the powered device is interfered, for example, by the entrapment based on the variation D of the difference B between the present rotation speed V and the ideal rotation speed A relative to the reference difference BASE. First, as shown in FIG. 11, whether the entrapment detection flag FD is at the ON state is determined (Step #31). In a case where the entrapment detection flag FD has been at the ON state either at the entrapment detection transaction (Step #10) by the common displacement interference detection portion 8 or at the entrapment detection transaction (Step #20) by the non-deceleration displacement interference detection portion 7, there is no need to repeat the execution of another entrapment detection transaction in the same calculation cycle. Accordingly, in a case where the entrapment detection flag FD is at the ON state, the state of the detection flag FD is maintained to end the transaction of Step #30 to complete the entrapment detection transaction of the calculation cycle. A signal indicating that the entrapment detection flag FD is ON is transmitted to the controller 50.

In a case where the entrapment detection flag FD is at the OFF state, consecutively, the variation D of the difference B between the present rotation speed V and the ideal rotation speed A relative to the reference difference BASE is calculated (Step #32). Then, the variation D and the threshold value TH3 are compared (Step #33). When the variation D is greater than the threshold value TH3, the entrapment detection flag FD is determined (renewed) to be the ON state (Step #36). That is, the entrapment is detected. In a case where the variation D is equal to or less than the threshold value TH3, the entrapment is not detected, and the entrapment detection flag FD is determined (re-determined) to be the OFF state (Step #37). As foregoing, the entrapment detection transaction of the calculation cycle is completed. In a case where the entrapment detection flag FD is at the ON state, a signal indicting that the entrapment detection flag FD is at the ON state is transmitted to the controller 50.

As explained above referring to FIGS. 8 through 11, the entrapment detection transaction (interference detection transaction) according to the embodiment is favorably applicable when at least one of the acceleration control, the constant speed control, and the deceleration control is executed. In other words, even if only one of the acceleration control, the constant speed control, and the deceleration control is executed, the interference detection transaction (e.g., entrapment detection transaction) according to the embodiment is favorably applicable. The main control portion 1 is configured to perform the acceleration control, the constant speed control, and the deceleration control, however, the main control portion 1 is not necessarily executing all of the controls every time.

Figure 12:
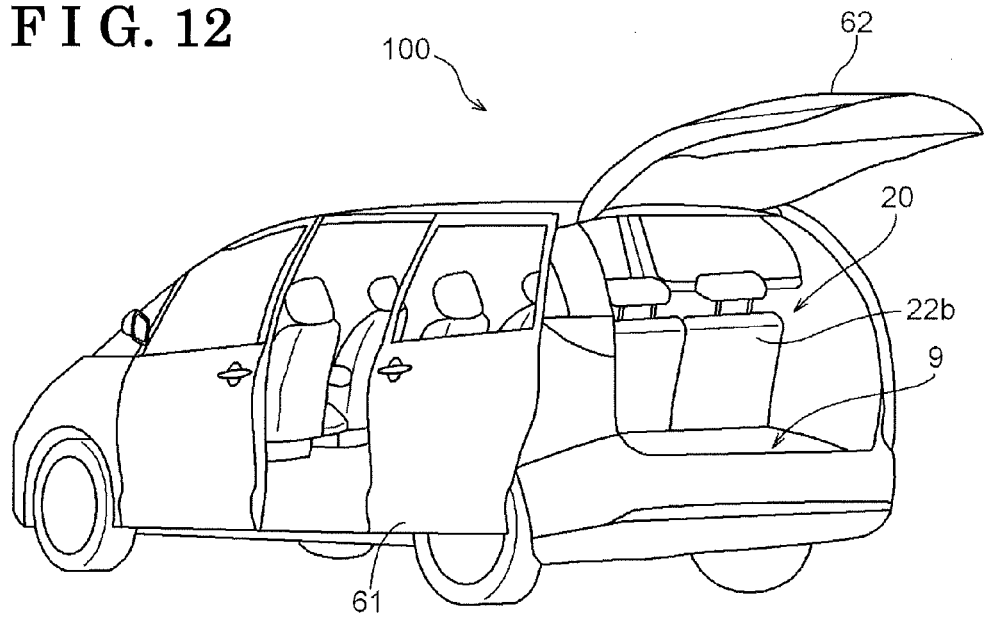
FIG. 12 is a perspective view of a vehicle.
Figure 13:
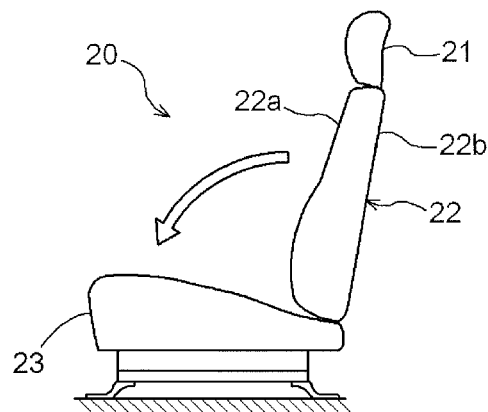
FIG. 13A is a first example of state changes of a vehicle seat where the seat is at a seatable state.
FIG. 13B is the first example of the state changes of the vehicle seat where the seat is at a stored state.
Figure 13:
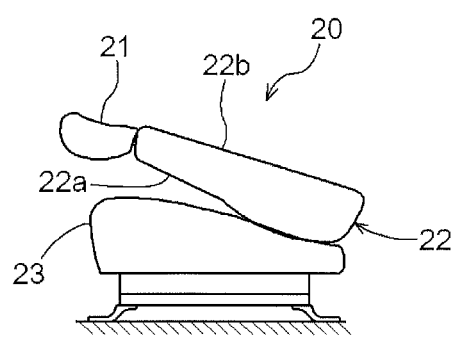
Figure 14:
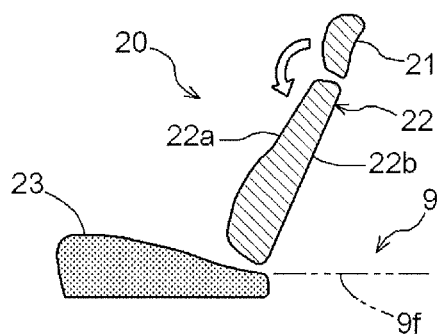
FIG. 14A is a second example of state changes of a vehicle seat where the seat is at a seatable state.
FIG. 14B is the second example of the state changes of the vehicle seat where the seat is in a process of changing states.
FIG. 14C is the second example of the state changes of the vehicle seat where the seat is in the process of changing states.
FIG. 14D is the second example of the state changes of the vehicle seat where the seat is at a stored state.
Figure 14:
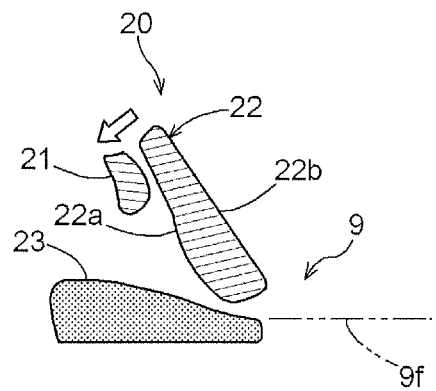
Figure 14:
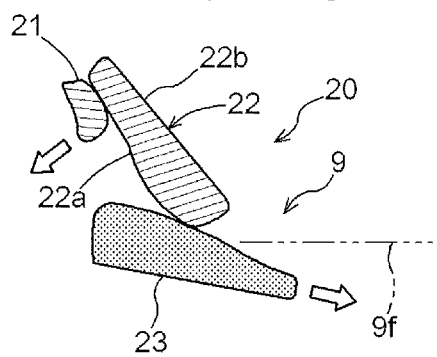
Figure 14:
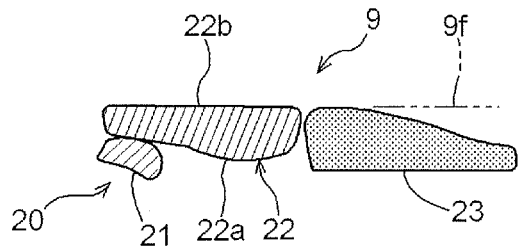

The motor control device according to the embodiment is applicable for detecting the entrapment at the powered device, for example, an electric driven slide door 61 and an electric driven backdoor 62 of a vehicle 100 shown in FIG. 12. Further, the motor control device according to the embodiment is applicable for detecting the entrapment at a seat apparatus 20 for a vehicle (i.e., hereinafter referred to as the seat 20) as illustrated in FIGS. 12 to 14D. An operation speed of the electric driven slide door 61, the electric driven backdoor 62, and the seat 20 are likely to be controlled by combining the acceleration control, the deceleration control, and the constant speed control. Further, the number of electric components provided on the vehicle has been increased, and thus an increase of the cost in a detection sensor for an entrapment and a rotation sensor causes an increase in the manufacturing cost, which is not favorable. As explained above, according to the embodiment, the entrapment is favorably detected using the rotation sensor 31 having the low resolution.

The seat 20 illustrated in FIGS. 12 to 14D includes a headrest 21, a seatback 22, and a seat cushion 23. The headrest 21 is configured to support a head portion of an occupant seated on the seat 20. The seatback 22 includes a supporting surface 22a which is configured to support the occupant facing a back of the occupant. The seat cushion 23 is configured to support the occupant facing the posterior of the occupant. In those circumstances, a back surface 22b which is an opposite surface of the supporting surface 22a of the seatback 22 faces a luggage compartment 9 of the vehicle 100. In other words, the seat 20 corresponds to a rearmost seat of which the back surface 22b of the seatback 20 serves as a portion of a wall surface of the luggage compartment 9. The seat 20 corresponds to a second row seat in a case where the vehicle includes two rows. The seat 20 corresponds to a third row seat in a case where the vehicle includes three rows.

The seat 20 is configured to change states to a seatable state where an occupant is seatable thereon, and a stored state where the seat 20 is stored in order to expand the size of the luggage compartment 9. Because the back of seat 20 corresponds to the luggage compartment 9, the space of the luggage compartment 9 is expanded by changing the state of the seat 20 to the stored state, thereby increasing a loading capacity. The stored state of the seat 20 may be changed in different manners according to usage. For example, as shown in FIGS. 13A and 13B, the seat 20 may be folded so that the supporting surface 22a of the seatback 22 faces the seat cushion 23 in the stored state. Further, in the stored state, the folded seat 20 may be accommodated in a recess portion formed on a vehicle floor. Alternatively, as illustrated in FIGS. 14A to 14D, in the stored state, the seat cushion 23 may be positioned at a level lower than a floor 9f of the luggage compartment 9 and the seatback 22 may be reclined to be positioned at the position of the seat cushion in the seatable state. Because the seatback 22 is arranged in an upright state in the seatable state, the seatback 22 is reclined and/or folded in order to expand the size of the luggage compartment 9. According to the constructions of the seat 2, a part of an occupant's body, occupant's clothes, and other object may be entrapped between the supporting surface 22a of the folding seatback 22 and the seat cushion 23, and between the sliding seat cushion 23 and the floor 9f of the luggage compartment. According to the constructions of the embodiment, the interference of the displacement of the powered device, or the entrapment is favorably detected without increasing manufacturing costs.

For example, when the displacement of the driven object 20, 61, 62 is interfered, because the difference between the target rotation speed and the actual rotation speed for the motor control is expanded, an output (torque) is increased in response to the feedback control. When the displacement of the driven object 20, 61, 62 is interfered, a level (value) of the ideal rotation speed A increases because the control results by the main control portion 1 including the feedback control is reflected on the ideal rotation speed A. On the other hand, in a case where the displacement of the driven object 20, 61, 62 is interfered, the actual rotation speed V does not increase. Particularly, when the interference of the displacement such as the entrapment is generated, unlike the case of frictions, the actual rotation speed V gradually decreases. In consequence, the difference B between the ideal rotation speed, A which increases in response to the reflection of the control results, obtained by the main control portion 1 and the actual rotation speed V, which declines by the interference of the displacement, expands. Accordingly, even during the deceleration control at which the rotation speed declines irrespective of the interference of the displacement of the driven object 20, 61, 62, interference of the displacement of the driven object 20, 61, 62 is favorably detected. Thus, according to the construction of the embodiment, the interference of the positional displacement of the driven object 20, 61, 62, for example, by the entrapment, can be detected even if the control for accelerating the rotation speed of the motor 30, the control for decelerating the rotation speed of the motor 30, and the control for maintaining the rotation speed of the motor 30 at a constant speed coexists.

According to the embodiment, the driven object 20, 61, 62 corresponds to the powered device which is applied to the vehicle.

According to the embodiment, the main control portion 1 controls the motor 30 by a pulse width modulation, and the ideal rotation speed A is calculated based on a function having the duty ratio PD of the pulse width modulation as a variable.

According to the embodiment, the output of the motor 30 is favorably controllable by controlling the duty ratio PD of the pulse width modulation PWM. According to the embodiment, because the ideal rotation speed A is calculated based on the function having the duty ratio PD as a variable, the ideal rotation speed A on which the results of the feedback control is appropriately reflected can be attained.

According to the embodiment, the motor control device includes the deceleration displacement interference detection portion 5 detecting the interference of the displacement of the driven object 20, 61, 62 when the motor is controlled in the deceleration control mode. The deceleration displacement interference detection portion 5 detects that the displacement of the driven object 20, 61, 62 is interfered using the difference B between the actual rotation speed V and the ideal rotation speed A.

According to the embodiment, the motor control device includes the deceleration displacement interference detection portion 5 detecting the interference of the displacement of the driven object 20, 61, 62 when the motor is controlled in the deceleration control mode. The deceleration displacement interference detection portion 5 detects that the displacement of the driven object 20, 61, 62 is interfered using the variation D of the difference B between the actual rotation speed V and the ideal rotation speed A.

According to the embodiment, the displacement interference detection portion 2 includes the reference difference maintaining portion 4 which maintains the difference B between the ideal rotation speed A and the actual rotation speed V immediately before the control mode of the motor 30 is shifted to the deceleration control mode as the reference difference BASE, and the deceleration displacement interference detection portion 5 detecting the interference of the displacement of the driven object 20, 61, 62 when the motor 30 is controlled in the deceleration control mode. The deceleration displacement interference detection portion 5 detects that the displacement of the driven object 20, 61, 62 is interfered based on the variation D of the difference B between the actual rotation speed V and the ideal rotation speed A relative to the reference difference BASE.

Generally, values of the actual rotation speed V vary depending on dispersions of products or the environment of the usage, which generates a difference between the actual rotation speed V and the ideal rotation speed A. However, according to the construction of the embodiment, because whether the displacement of the driven object 20, 61, 62 is interfered during the deceleration control is detected based on the variation relative to the reference difference, high precision of the detection can be attained.

According to the embodiment, the displacement interference detection portion 2 includes the maximum value maintaining portion 6 which maintains the maximum value C of the actual rotation speed V when the motor 30 is controlled in the acceleration control mode or the constant speed control mode, and the non-deceleration displacement interference detection portion 7 which detects the interference of the displacement of the driven object 20, 61, 62 when the motor 30 is controlled in the acceleration control mode or the constant speed control mode. The non-deceleration displacement interference detection portion 7 detects that the displacement of the driven object 20, 61, 62 is interfered based on the difference CC between the latest actual rotation speed V and the maximum value C.

In a case where the motor 30 is controlled by the acceleration control or the constant speed control, the displacement of the driven object 20, 61, 62 is most likely interfered as a factor which declines the rotation speed of the motor. Accordingly, by using the actual rotation speed V of the motor 30, the occurrence of the interference of the displacement of the driven object 20, 61, 62 is detected with relatively high precision. In those circumstances, the actual rotation speed V may fluctuate to increase or to decrease even during the constant speed control, and the actual rotation speed V may temporarily decline even during the acceleration control. Because the control for declining the actual rotation speed V is not applied to the motor 30 during the constant speed control and the acceleration control, the difference between the preceding maximum rotation speed and the actual rotation speed V during the constant speed control and the acceleration control is determined to be based on a factor which is irrelevant to the motor control. The factor is most likely based on, for example, a condition which interferes with the displacement of the driven object 20, 61, 62 such as an entrapment, and the generation of such condition is detected with high precision based on the difference CC between the maximum rotation speed C and the actual rotation speed V.

According to the embodiment, the displacement interference detection portion 2 includes the common displacement interference detection portion 8 which detects the interference of the displacement of the driven object 20, 61, 62 irrespective of the control mode of the motor 30. The common displacement interference detection portion 8 detects that the displacement of the driven object 20, 61, 62 is interfered in a case where the difference B between the actual rotation speed V and the ideal rotation speed A is equal to or greater than the predetermined threshold value TH1.

As explained above, the difference between the ideal rotation speed A which increases in response to the control results by the main control portion 1 and the actual rotation speed V which declines due to the interference of the displacement of the driven object 20, 61, 62 expands. Accordingly, even when the rotation speed of the motor 30 declines because of the deceleration control, the occurrence of the interference of the displacement of the driven object 20, 61, 62 is favorably detected. As explained above, at the deceleration control, whether the displacement of the driven object 20, 61, 62 is interfered is detected with high precision based on the variation D relative to the reference difference BASE. However, in a case where the entrapment occurs at the beginning of the displacement of the driven object 20, 61, 62 and the motor control phase is transited to the deceleration control without detecting the interference of the displacement of the driven object 20, 61, 62 during the acceleration control and the constant speed control, the detection of the interference may be further delayed or the detection of the interference may not be achieved because the value of the reference difference cannot be correctly attained. In order to overcome this drawback, the common displacement interference detection portion 8 is provided. By the common displacement interference detection portion 8, the detection of the interference using the ideal rotation speed A is executed during the acceleration control and the constant speed control, and the detection of the inference is executed by another determination reference during the deceleration control. In consequence, an interference detection performance applicable to a wide range of conditions is ensured.

In a case of changing states or positions of the vehicle seat, the seat is displaced to the mechanical end points. In those circumstances, the rotation speed of the motor 30 (the seat 20) may be adequately reduced at the end points so that the seat is stopped without receiving an impact. Further, considering a contact of the seat 20 to an occupant or a load applied to the motor 30, it is not favorable to suddenly move the seat 20, and the seat 20 may be controlled to gradually start moving. In addition, the state changes of the vehicle is preferably completed as swiftly as possible, and the motor speed (seat speed) may be appropriately increased by the acceleration control. In the vehicle seat control, the acceleration control, the constant speed control, and the deceleration control may coexist, and a part of the occupant's body, clothes of an occupant, and other objects may be possibly entrapped. By constructing the seat control apparatus for the vehicle to include the motor control device, the occurrence of the interference of the displacement of the vehicle seat, for example by the entrapment, is favorably detected.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motor control device, comprising:
a main control portion configured to actuate a motor, which displaces a driven object between a first position and a second position in an acceleration control mode in which a rotation speed of the motor gradually increases, in a deceleration control mode in which the rotation speed of the motor gradually decreases, and in a constant speed control mode in which the rotation speed of the motor is maintained at a constant level; and
a displacement interference detection portion detecting that the displacement of the driven object is interfered by using an actual rotation speed, which is the actual rotation speed of the motor, and an ideal rotation speed of the motor, on which a control result obtained by the main control portion including a feedback control is reflected; wherein
the displacement interference detection portion includes a reference difference maintaining portion which maintains a difference between the ideal rotation speed and the actual rotation speed immediately before a control mode of the motor is shifted to the deceleration control mode as a reference difference, and a deceleration displacement interference detection portion detecting the interference of the displacement of the driven object when the motor is controlled in the deceleration control mode; and wherein
the deceleration displacement interference detection portion detects that the displacement of the driven object is interfered based on a variation of a difference between the actual rotation speed and the ideal rotation speed relative to the reference difference.

2. The motor control device, according to claim 1, wherein the driven object corresponds to a powered device which is applied to a vehicle.

3. The motor control device according to claim 1, wherein the main control portion controls the motor by a pulse width modulation; and wherein
the ideal rotation speed is calculated based on a function having a duty ratio of the pulse width modulation as a variable.

4. The motor control device according to claim 1, further comprising:
a deceleration displacement interference detection portion detecting the interference of the displacement of the driven object when the motor is controlled in the deceleration control mode; and wherein
the deceleration displacement interference detection portion detects that the displacement of the driven object is interfered using a difference between the actual rotation speed and the ideal rotation speed.

5. The motor control device according to claim 1, further comprising:
a deceleration displacement interference detection portion detecting the interference of the displacement of the driven object when the motor is controlled in the deceleration control mode; and wherein
the deceleration displacement interference detection portion detects that the displacement of the driven object is interfered using a variation of a difference between the actual rotation speed and the ideal rotation speed.

6. The motor control device according to claim 1, wherein the displacement interference detection portion includes a maximum value maintaining portion which maintains a maximum value of the actual rotation speed when the motor is controlled in the acceleration control mode or the constant speed control mode, and a non-deceleration displacement interference detection portion which detects the interference of the displacement of the driven object when the motor is controlled in the acceleration control mode or the constant speed control mode; and wherein the non-deceleration displacement interference detection portion detects that the displacement of the driven object is interfered based on a difference between the latest actual rotation speed and the maximum value.

7. The motor control device according to claim 1, wherein the displacement interference detection portion includes a common displacement interference detection portion which detects the interference of the displacement of the driven object irrespective of a control mode of the motor; and wherein the common displacement interference detection portion detects that the displacement of the driven object is interfered in a case where a difference between the actual rotation speed and the ideal rotation speed is equal to or greater than a predetermined threshold value.

8. A motor control device, comprising:

a main control portion configured to actuate a motor, which displaces a powered device applied to a vehicle between a first position and a second position in an acceleration control mode in which a rotation speed of the motor gradually increases, in a deceleration control mode in which the rotation speed of the motor gradually decreases, and in a constant speed control mode in which the rotation speed of the motor is maintained at a constant level; and a displacement interference detection portion detecting that the displacement of the powered device is interfered using an actual rotation speed, which is the actual rotation speed of the motor, and an ideal rotation speed of the motor, on which a control result by the main control portion including a feedback control is reflected, the displacement interference detection portion including a reference difference maintaining portion, which maintains a difference between the ideal rotation speed and the actual rotation speed immediately before a control mode of the motor is shifted to the deceleration control mode as a reference difference, and a deceleration displacement interference detection portion detecting the interference of the displacement of the powered device when the motor is controlled in the deceleration control mode; wherein the deceleration displacement interference detection portion detects that the displacement of the powered device is interfered based on a variation of a difference between the actual rotation speed and the ideal rotation speed relative to the reference difference.

9. A motor control device, comprising:

a main control portion configured to actuate a motor, which displaces a driven object between a first position and a second position in an acceleration control mode in which a rotation speed of the motor gradually increases, in a deceleration control mode in which the rotation speed of the motor gradually decreases, and in a constant speed control mode in which the rotation speed of the motor is maintained at a constant level; and a displacement interference detection portion detecting that the displacement of the driven object is interfered by using an actual rotation speed, which is the actual rotation speed of the motor, and an ideal rotation speed of the motor, on which a control result obtained by the main control portion including a feedback control is reflected; wherein the displacement interference detection portion includes a maximum value maintaining portion which maintains a maximum value of the actual rotation speed when the motor is controlled in the acceleration control mode or the constant speed control mode, and a non-deceleration displacement interference detection portion which detects the interference of the displacement of the driven object when the motor is controlled in the acceleration control mode or the constant speed control mode; and wherein the non-deceleration displacement interference detection portion detects that the displacement of the driven object is interfered based on a difference between the latest actual rotation speed and the maximum value.

10. The motor control device, according to claim 9, wherein the driven object corresponds to a powered device which is applied to a vehicle.

11. The motor control device according to claim 9, wherein the main control portion controls the motor by a pulse width modulation; and wherein the ideal rotation speed is calculated based on a function having a duty ratio of the pulse width modulation as a variable.

12. The motor control device according to claim 9, further comprising:

a deceleration displacement interference detection portion detecting the interference of the displacement of the driven object when the motor is controlled in the deceleration control mode; and wherein the deceleration displacement interference detection portion detects that the displacement of the driven object is interfered using a difference between the actual rotation speed and the ideal rotation speed.

13. The motor control device according to claim 9, further comprising:

a deceleration displacement interference detection portion detecting the interference of the displacement of the driven object when the motor is controlled in the deceleration control mode; and wherein the deceleration displacement interference detection portion detects that the displacement of the driven object is interfered using a variation of a difference between the actual rotation speed and the ideal rotation speed.

14. The motor control device according to claim 9, wherein the displacement interference detection portion includes a common displacement interference detection portion which detects the interference of the displacement of the driven object irrespective of a control mode of the motor; and wherein the common displacement interference detection portion detects that the displacement of the driven object is interfered in a case where a difference between the actual rotation speed and the ideal rotation speed is equal to or greater than a predetermined threshold value.

* * * * *